United States Patent [19]

Fromm

[11] Patent Number: 4,483,324
[45] Date of Patent: Nov. 20, 1984

[54] HEAT COLLECTING AND HEAT LOSS PREVENTING APPARATUS

[75] Inventor: Pierra H. Fromm, Baja California, Mexico

[73] Assignee: W. Keith Watson, Alpine, Calif.; part interest

[21] Appl. No.: 494,702

[22] Filed: May 16, 1983

[51] Int. Cl.³ .................................................. F24J 3/02
[52] U.S. Cl. ..................................... 126/439; 126/425; 126/437
[58] Field of Search ............... 126/437, 439, 438, 424, 126/451, 425

[56] References Cited

U.S. PATENT DOCUMENTS

| | | | |
|---|---|---|---|
| 3,872,854 | 3/1975 | Raser . | |
| 4,088,266 | 5/1978 | Keyes | 126/430 |
| 4,127,104 | 11/1978 | Greene | 126/437 X |
| 4,173,213 | 11/1979 | Kelly | 126/425 |
| 4,280,480 | 7/1981 | Raposo . | |
| 4,306,544 | 12/1981 | Clemens . | |
| 4,324,947 | 4/1982 | Dumbeck | 126/438 X |
| 4,356,812 | 11/1982 | Hanen | 126/438 |
| 4,365,615 | 12/1982 | Melvin | 126/438 X |
| 4,391,269 | 7/1983 | Watson | 126/437 |

Primary Examiner—Larry Jones
Attorney, Agent, or Firm—William W. Haefliger

[57] ABSTRACT

Solar heating apparatus comprises:

(a) a generally horizontally elongated tank to contain liquid, the tank being solar radiation absorbing, and low intensity infra-red emitting, (b) a generally longitudinally horizontally elongated container extending about the tank, the container including glazing having a first section facing the top length of the tank, and a second section facing a front side length of the tank, the glazing sections adapted to pass solar radiation for impingement on the tank, (c) auxiliary panels having extended positions in which they project generally away from the container, and collapsed positions in which the panels substantially cover said first and second sections of the glazing to block heat loss from the tank at night, (d) the panels having reflecting surfaces for reflecting solar radiation toward and through the glazing in said panel extended positions, (e) and means responsive to the intensity of solar radiation to move at least one of the panels between extended and collapsed positions.

19 Claims, 9 Drawing Figures

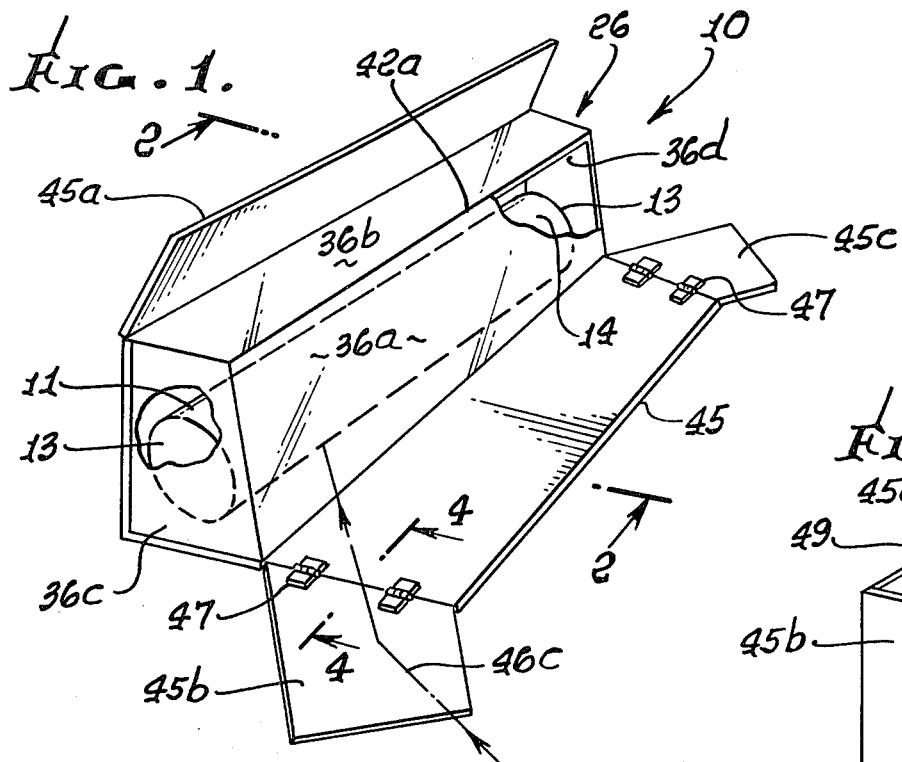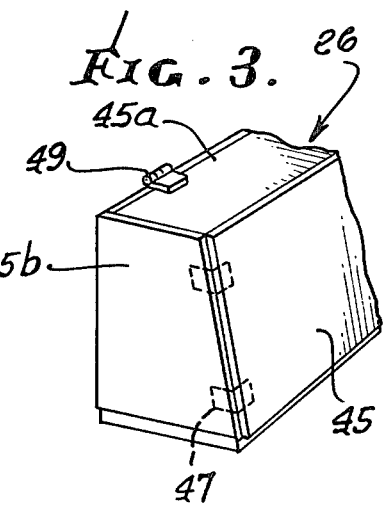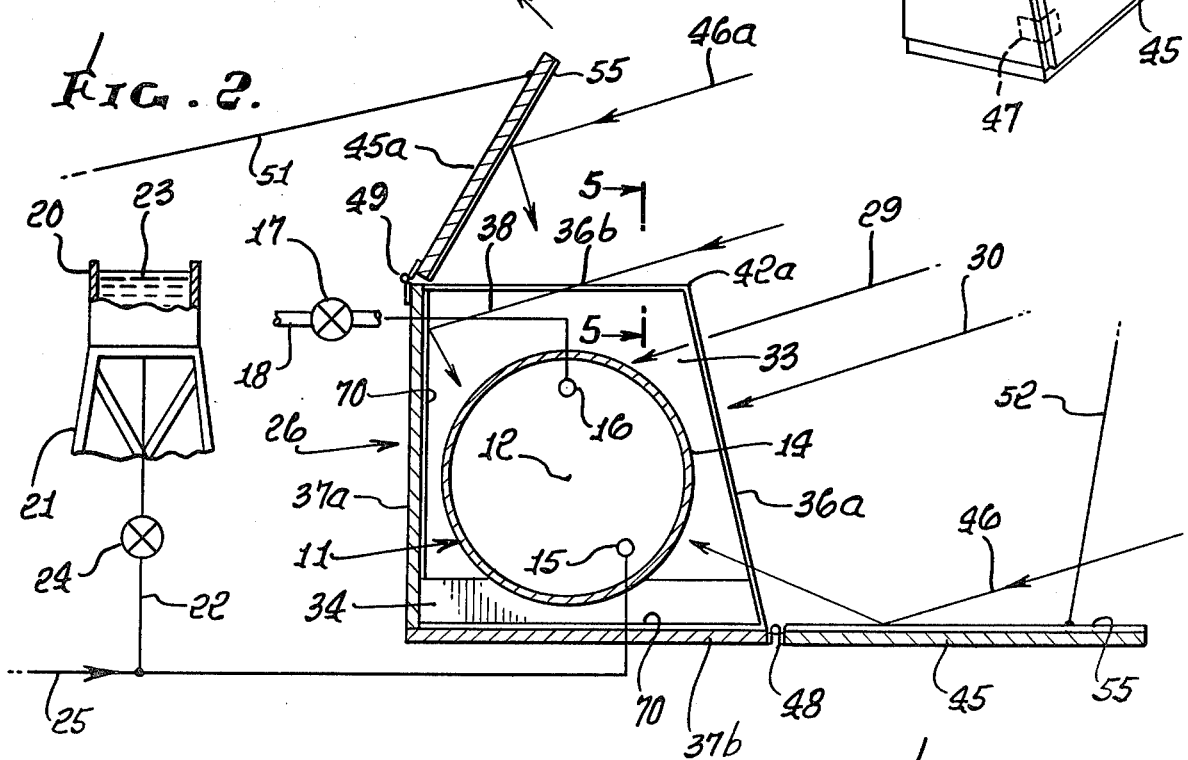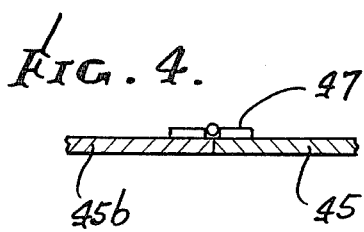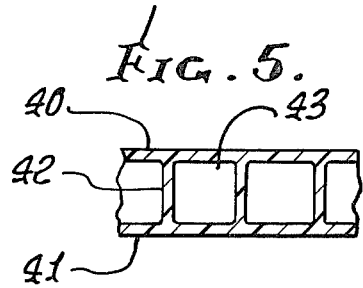

HEAT COLLECTING AND HEAT LOSS PREVENTING APPARATUS

BACKGROUND OF THE INVENTION

This invention relates generally to heat collecting and heat loss preventing apparatus; and more particularly concerns a solar heater of high efficiency, and unusually effective construction.

There is need in many areas of the world for water heaters that are simple, easy to use, efficient, and which will provide pressurized flow of heated liquid such as water. Prior designs of which I am aware do not meet these objectives to provide the unusually advantageous combinations of features and modes of operation as are found in the device of the present invention.

SUMMARY OF THE INVENTION

It is a major object of the invention to provide apparatus meeting the above needs. Basically, the apparatus comprises:

(a) a generally horizontally elongated tank to contain liquid, the tank being solar radiation absorbing, (b) a generally longitudinally horizontally elongated container extending about the tank, the container including glazing having a first section facing the top length of the tank, and a second section facing side length of the tank, the glazing sections adapted to pass solar radiation for impingement on the tank, (c) auxiliary panels having extended positions in which they project generally away from the container, and collapsed positions in which panels substantially cover said sections of the glazing to block heat loss from the tank at night, and (d) the panels having reflecting surfaces for reflecting solar radiation toward and through the glazing in panel extended positions, (e) and means responsive to the intensity of solar radiation to move at least one of the panels between extended and collapsed positions.

As will appear, the container glazing may define flat planar sections extending at angles relative to one another; the panels may include first, second and third panels corresponding to glazing first, second and third sections; the glazing may include a fourth section, at the opposite end of the tank, and there may be a fourth panel to cover that glazing; the third and fourth panels may be connected to the second panel to provide a compact assembly; and there may be adjustment controls for the panels; also, an external reservoir for liquid (or line pressure) may be used to provide constant pressurization of the tank liquid.

These and other objects and advantages of the invention, as well as the details of an illustrative embodiment, will be more fully understood from the following specification and drawings, in which:

DRAWING DESCRIPTION

FIG. 1 is a perspective view of apparatus incorporating the invention;

FIG. 2 is an enlarged vertical section on lines 2—2 of FIG. 1;

FIG. 3 is a fragmentary perspective view showing the heater glazing covered by panels;

FIG. 4 is an enlarged section on lines 4—4 of FIG. 1; and

FIG. 5 is a section on lines 5—5 of FIG. 2;

DETAILED DESCRIPTION

Figure 6:
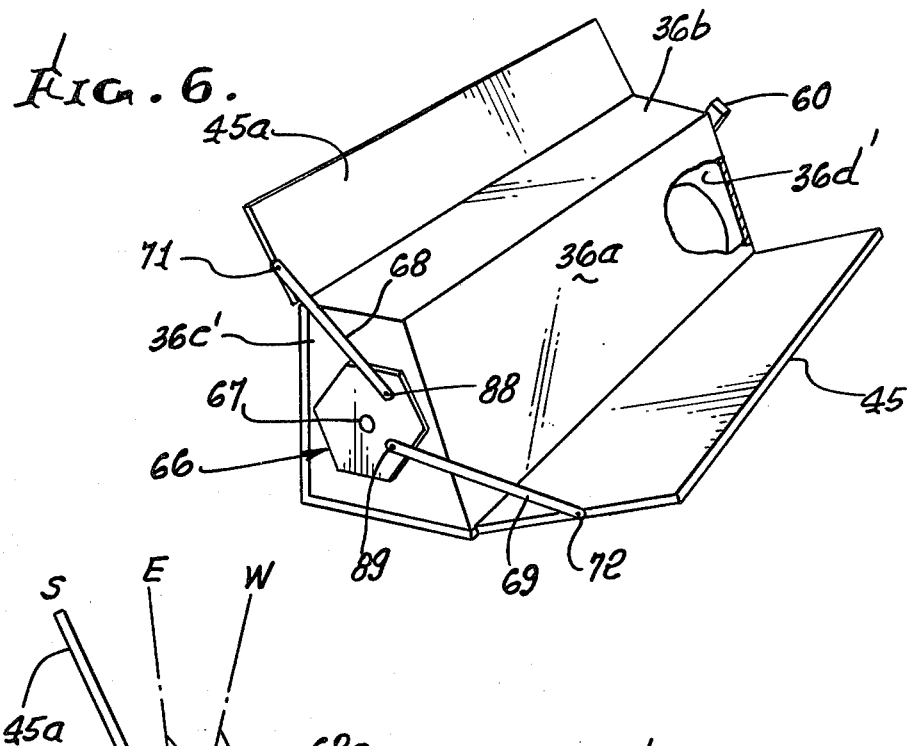
FIG. 6 is a view like FIG. 1, showing a modification.

In the drawings, the solar heater apparatus 10 includes a generally longitudinally horizontally elongated tank 11 to contain liquid, as for example water. The tank may be metallic, and circular in cross section, with a horizontal axis 12. It is shown to have end walls 13, and a circular side wall 14, with a lower fill port 15 and a higher discharge port 16 in the opposite end walls. A valve 17 in the discharge line 18 controls warm or hot liquid discharge, as required. The steel wall of the tank may be treated with a nickel substrate chromium oxide coating compound such as MAXORB, a product of International Nickel Co., Birmingham, England. Such compounds allows high absorptivity of solar waves, and low emissivity of longer infra-red waves as at night, for heat loss suppression.

Liquid in the tank is typically pressurized and the tank kept full, so that warm liquid will always flow from the higher exit port 16. One such liquid pressurization means is shown in FIG. 2 to comprise a fill reservoir 20 supported by structure 21 at a higher level than tank 11, a line 22 conducting liquid 23 from tank 20 to tank 11 via control valve 24 and fill port 15. Liquid may be periodically filled into reservoir 20, whereby liquid in tank 11 is always pressurized, so that in remote regions warm liquid (such as water) under pressurization, is always available. A pressurized source, indicated by line 25, may alternatively be used.

A generally longitudinally extending, horizontally elongated container or housing such as is indicated at 26, is employed to extend about or in association with the tank 11, the container defining glazing sections (planar, for ease of construction) 36a at the front of the container, 36b at the top of the container, 36c at one end of the container, and 36d at the opposite end. The glazing is adapted to receive impingement of solar radiation and to pass such radiation for direct impingement on the tank, i.e. at the top, front and opposite ends thereof. See in this regard, solar rays 29 and 30 impinging as shown. Air in space 33 between the tank and container is also heated and serves as an insulative barrier to block heat conduction from the tank. The latter is supported at 34, as via wooden blocks or other means, so that barrier space 33 extends through an angle sub-tending over 180°, about the tank.

The container typically includes rear wall 37a and bottom wall 37b, the latter for example consisting of wood or synthetic resin (plastic) material. Urethane or isocyanurate foams are examples. Walls 37a and 37b are coated with or carry mirror-like reflecting material 70, such as aluminum foil or metallized plastic, to reflect solar rays as at 38 to the back side of the tank, and infra-red waves back to the tank bottom. The glazing sections may advantageously consist of TWIN WALL TUFFAK 60, distributed by Rohm and Hass, or other multiple glazed polycarbonate materials, with multiple walls and intermediate chambers. See FIG. 5 showing parallel walls 40 and 41, integrally interconnected by ribs 42, with trapped air spaces appearing at 43. This affords a very efficient additional means to block heat conduction and free convection in an outward direction. Two (joined) thicknesses of the FIG. 5 glazing may be used, for added prevention of heat loss as in especially cold climates. A third and single glazing may be spaced inwardly of two such glazings. The sections 36a and 36b are suitably interconnected and bent or sealed along longitudinal junction 42a to provide rigidity. The spacing between glazing section walls, as at 40 and 41 provides insulation.

Also provided are an auxiliary solar radiation collecting and reflecting panels projecting generally away from the container, from regions above, below and generally endwise of the glazing sections, to collect and reflect additional solar radiation from many directions toward and through the glazing, for impingement on the tank, to enhance heating of liquid therein. See for example lower and front panel 45 reflecting solar radiation beam or ray 46 toward and through glazing 36a as during winter months. See also second and upper panel 45a in raised condition and reflecting ray 46a toward and through glazing section 36b. Also note third and fourth panels 45b and 45c hinge connected at 47 to opposite ends of panel 45. Ray 46c is shown reflected by panel 45b in FIG. 1 through glazing section 36a, toward the tank.

The panels 45 and 45a may typically be hinge connected at 48 and 49 to the container walls, to accommodate panel extension (see FIGS. 1 and 2) and panel collapse (see FIG. 3). In extended condition the panel sections fully reflect solar radiation toward the container or tank, as during the day. This lessens or eliminates the need for swinging of the container and tank to "follow" the sun as it relatively crosses the sky during the day. At night, the panels may be collapsed as in FIG. 3, to enclose or cover the glazing sections 36a, 36b, 36c and 36d, to provide maximum protection against loss of heat from the tank liquid, by radiation convection and conduction. Thus, the panel sections 45, 45a, 45b and 45c co-operate, by hinging at 48, 49 and 47 to conform to and cover the glazing sections 36a, 36b, 36c and 36d, as shown. Collapsing and extension of panel sections may be carried out manually, or by an actuator. Lines 51 and 52 are representative of such an actuator, which may be solar intensity responsive, as described below.

The panels may consist of wood, or plastic or other highly insulative material, with highly reflective mirror surfaces applied thereto, as at 55. Typical of such surfaces are aluminum foil, or metallized plastic sheet.

From the foregoing, it is clear that the invention provides maximum extended reflector panel extent, to reflect solar rays into the front, top and opposite ends of a glazed container for a heater tank, and also, employs the same panels in collapsed condition to block heat loss via said glazing, at night.

Angling of panels 45 in FIG. 3 assures closing of panels 45b and 45c toward end glazings 36c and 36d, respectively.

A wetting agent (surfactant for example) on the glazing protects against fogging. A wicking system can be employed to remove moisture from inner glazing surfaces.

Referring now to FIG. 6, the elements shown are the same as in FIG. 1, excepting that end panels 45b and 45c are omitted; also the end walls 36c' and 36d' of the container may not be glazed, and may instead be opaque, and insulative. FIG. 6 illustrates the provision of means responsive to the intensity of solar radiation automatically to move at least one of the panels 45 and 45a, and preferably both, between extended and collapsed positions. For example, the automatic means closes the panels when the solar intensity drops below a predetermined level, as in late afternoon or early evening, and to open them up in the morning.

Figure 7:
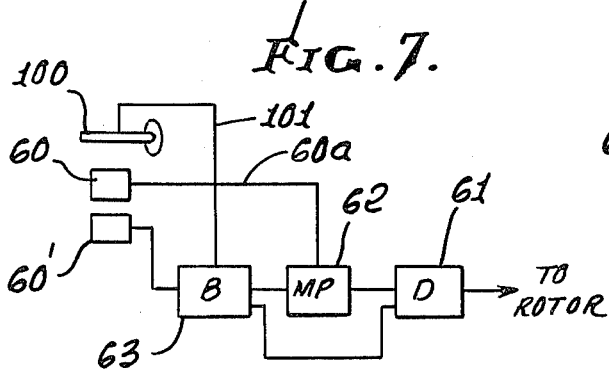
FIG. 7 is a block diagram.

In the example shown, a solar intensity detector 60 is located near the far end of the container to face the sky. A drive 61 is operatively connected between that detector and the panels to move them, as described. FIG. 7 shows the detector output 60a connected to micro processor 62, which activates the drive 61 when the output 60a drops below, or increases above a predetermined threshold or thresholds. Battery 63 which powers elements 61 and 62 may be powered by the element 60, or by another solar responsive, current generating element 60'.

Drive 60 may include a prime mover such as an electrical motor 65, for example a gearmotor (see in FIG. 8) whose output shaft delivers sufficient torque to rotate rotor 66 clockwise and counterclockwise, to swing the panels 45 and 45a between open and closed positions. Rotor is located adjacent the end wall 36c' to rotate about an axis 67 parallel with the hinge axes of the panels 45 and 45a. Links 68 and 69 are pivotally connected at 71, 72, 88 and 89 between the rotor and panels, as shown, to swing them to closed positions as the rotor rotates clockwise, and to swing them to open position as the rotor rotates counterclockwise. If desired, the drive, such as fluid responsive actuator 74 may be employed, as shown in FIG. 9. Note fluid pressure valves 75 and 76 controlling fluid pressure flow to opposite ends of the actuator. Fluid pressure may be derived from a pressurized water line, indicated at 78. Solenoids 79 and 80 control the valves, and are controlled by the micro processor 62'.

Figure 8:
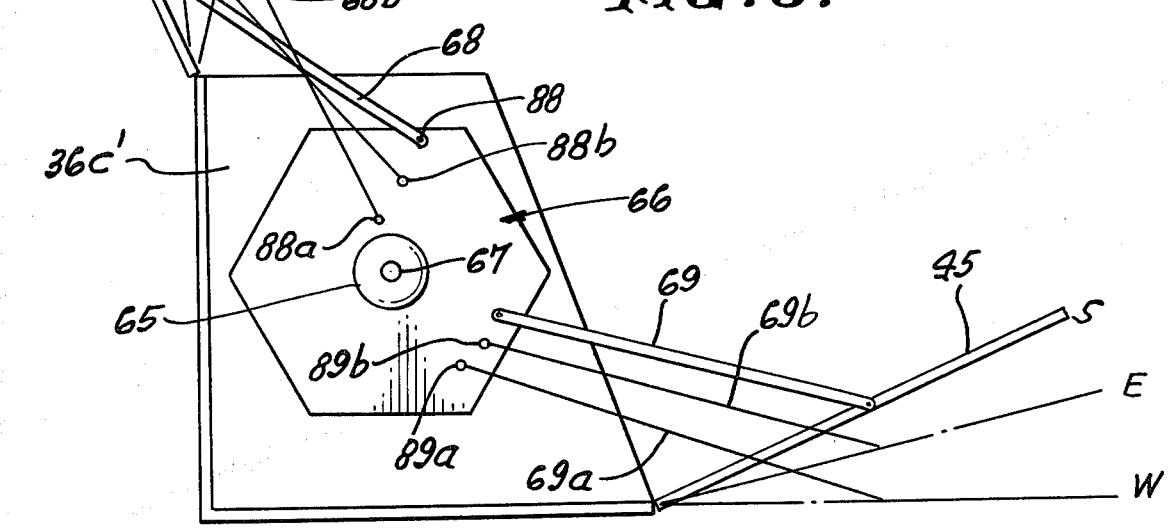
FIG. 8 is a diagrammatic end view of the FIG. 6 device.
Figure 9:
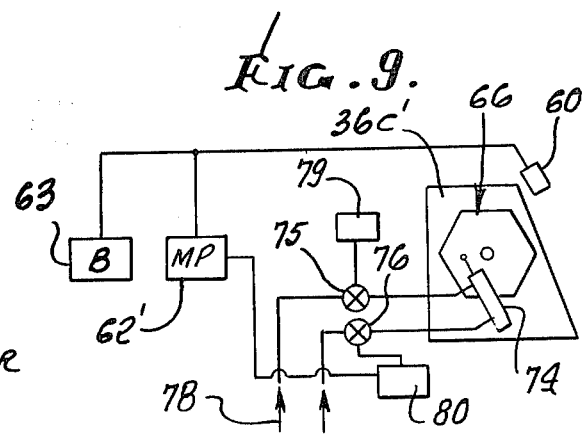
FIG. 9 is a diagrammatic view of another modification.

FIG. 8 shows adjustable positions of the links, for different seasons of the year. Thus, link positions 68 and 69 are as in FIG. 8, for summer; link positions 68a and 69a are for winter (lower sun height); and link positions 68b and 69b are for near equinox conditions (fall and spring). Different link attachment locations on the rotor may be provided for these purposes, as indicated at 88, 88a, 88b, and 89, 89a and 89b. Note that the links are connected between the panels and rotor so that as panel 45 is raised, panel 45a lowered, and vice versa, for counterbalance purposes, enabling a smaller size or power drive motor or actuator.

Finally, FIG. 7 shows a wind flow meter 100 Pitot Tube, pivoted and vaned to point into the wind, to sense wind velocity and produce a corresponding output at 101. If that output exceeds a predetermined level (high wind), the micro processor senses same and closes the panels, and vice versa (low wind, panels opened).

I claim:
1. In solar heating apparatus,
(a) a generally horizontally elongated tank to contain liquid, the tank being solar radiation absorbing, and low intensity infra-red emitting,
(b) a housing associated with the tank and including glazing facing the tank and adapted to pass solar radiation for impingement on the tank,
(c) auxiliary panel means including upper and lower panels associated with the housing and pivotally movable between extended and collapsed positions so as to block heat loss from the tank at night,
(d) the panel means having reflecting surface or surfaces for reflecting solar radiation toward and through the glazing and toward the tank in panel extended position or positions, and (e) means responsive to the intensity of said solar radiation automatically to move the panel means between said positions, said means including a drive rotor proximate an end of said elongated container, a drive connected to said rotor to rotate same, and members connected between said rotor and said upper and lower panels to simultaneously displace the upper panel relatively downwardly toward collapsed position as the lower rotor moves relatively upwardly toward collapsed position in response to rotor rotation.

2. The apparatus of claim 1 wherein said (e) means includes a solar detector, and said drive is operatively connected between said detector and panel means to move the panel means to collapsed position or positions in response to predetermined decrease in solar intensity at the detector.

3. In solar heating apparatus,
(a) a generally horizontally elongated tank to contain liquid, the tank being solar radiation absorbing,
(b) a generally longitudinally horizontally elongated container extending about the tank, the container including glazing having a first section facing the top length of the tank, a second section facing a front side length of the tank, and a third section facing one end of the tank, the glazing sections adapted to pass solar radiation for impingement on the tank,
(c) auxiliary panels having extending positions in which they project generally away from the container, and collapsed positions in which the panels substantially cover said first, second and third sections of the glazing to block heat loss from the tank at night,
(d) at least two of the panels having reflecting surfaces for reflecting solar radiation toward and through the glazing in said panel extended positions,
(e) said panels including upper and lower pivotally supported panels, there being means responsive to the intensity of solar radiation to move the panels between said positions, including rotary means connected with the upper and lower panels to simultaneously pivotally lower the upper panel and pivotally raise the lower panel whereby the weights of said two panels are counterbalanced during said pivoting.

4. In solar heating apparatus,
(a) a generally horizontally elongated tank to contain liquid, the tank being solar radiation absorbing, and low intensity infra-red emitting,
(b) a generally longitudinally horizontally elongated container extending about the tank, the container including glazing having a first section facing the top length of the tank, and a second section facing a front side length of the tank, the glazing sections adapted to pass solar radiation for impingement on the tank,
(c) auxiliary panels having extended positions in which they project generally away from the container, and collapsed positions in which the panels substantially cover said first and second sections of the glazing to block heat loss from the tank at night, said panels including an upper panel facing said first section and a lower panel facing said second section in panel collapsed positions, (d) the panels having reflecting surfaces for reflecting solar radiation toward and through the glazing in said panel extended positions,
(e) and means responsive to the intensity of solar radiation to move first and second of the panels between extending and collapsed positions, said means including a drive rotor proximate an end of said elongated container, a drive connected to said rotor to rotate same, and members connected between said rotor and said upper and lower panels to simultaneously displace the upper panel relatively downwardly toward collapsed position as the lower panel is displaced relatively upwardly toward collapsed position in response to rotor rotation.

5. The apparatus of claim 4 wherein said glazing includes a third section facing one end of the tank, and said panels include first, second and third thermally insulative panels respectively corresponding in size to said first, second and third glazing sections.

6. The apparatus of claim 5 wherein said third panel has hinged connection to said second panel.

7. The apparatus of claim 5 wherein the glazing includes a fourth section facing the opposite end of the tank, and said panels include a fourth panel having an extended first position in which it projects generally away from the container, and a collapsed position in which it substantially covers said fourth glazing section.

8. The apparatus of claim 7 wherein said third and fourth panels have hinged connection to said second panel.

9. The apparatus of one of claims 6 or 8 wherein said first panel has hinged connection to the container and said second panel has hinged connection to the container.

10. The apparatus of one of claims 4-8 wherein said container includes insulative rear and bottom walls.

11. The apparatus of claim 10 wherein said rear wall has a reflective surface facing the rear side of the tank to reflect solar radiation toward said rear side.

12. The apparatus of one of claims 4-8 and 11 including a wetting agent on the exterior surface of said glazing.

13. The apparatus of one of claims 6 or 8 wherein said members include cables connected to said panels to adjust the panel positions.

14. The combination of claim 4 wherein said (e) means includes a solar intensity detector operatively connected with said drive.

15. The combination of claim 14 wherein said drive is connected with said detector to move said panels from extended to collapsed positions in response to decrease of detected solar intensity below a predetermined level.

16. The combination of claim 15 wherein said drive includes a prime mover, and said members comprise links connecting said rotor with panels.

17. The combination of claim 16 wherein said first and second panels have hinged connection to said container, and said rotor and links are located so that as the weight of one panel is elevated, the weight of the other panel is lowered.

18. The combination of claim 17 including means to adjust the extended positions of the panels in accordance with seasonal changes in elevation of the sun.

19. The combination of claim 4 including means responsive to wind velocity to produce a signal operable to effect panel means movement between extended and collapsed positions.

* * * * *